F. G. DAVIS.
REAR END DOOR FOR VEHICLE BODIES.
APPLICATION FILED APR. 23, 1917.
1,245,881.
Patented Nov. 6, 1917.
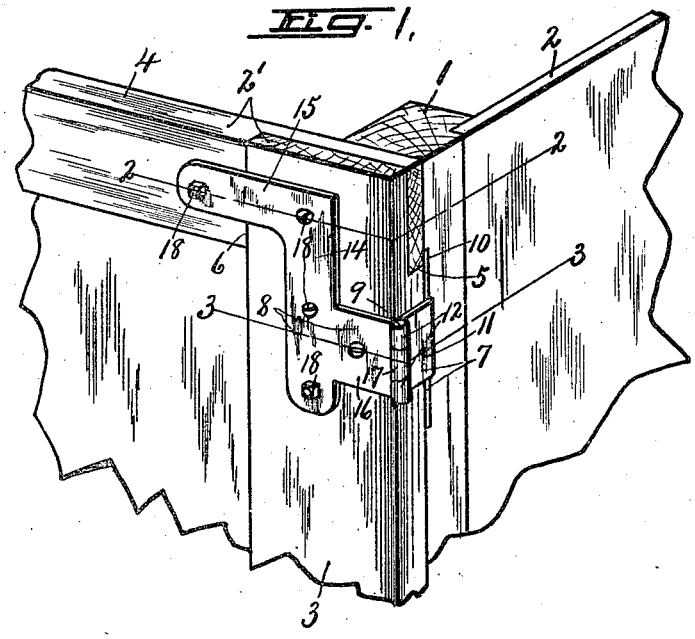
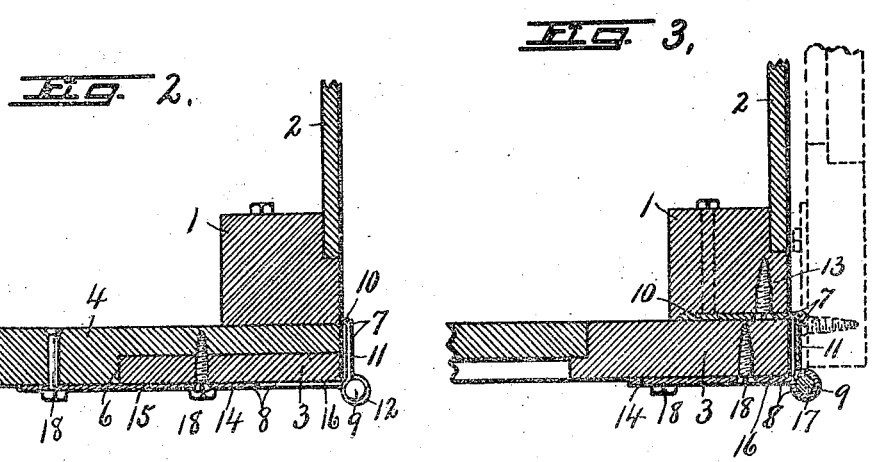
WITNESSES:
INVENTOR
F. G. Davis
BY Howard S. Hunford
ATTORNEY

UNITED STATES PATENT OFFICE.

FRANCIS G. DAVIS, OF WATERTOWN, NEW YORK, ASSIGNOR TO H. H. BABCOCK COMPANY, OF WATERTOWN, NEW YORK, A CORPORATION OF NEW YORK.

REAR-END DOOR FOR VEHICLE-BODIES.

1,245,881.  Specification of Letters Patent.  Patented Nov. 6, 1917.

Application filed April 23, 1917. Serial No. 163,962.

*To all whom it may concern:*

Be it known that I, FRANCIS G. DAVIS, a citizen of the United States of America, and resident of Watertown, in the county of Jefferson, in the State of New York, have invented new and useful Improvements in Rear-End Doors for Vehicle-Bodies, of which the following, taken in connection with the accompanying drawings, is a full, clear, and exact description.

This invention relates to certain improvements in rear end doors for vehicle bodies, and refers more particularly to the structure of the hinge and its mode of application to certain structural elements of the door and body, the primary object of which is to assist in bracing the frame of the door at its junction with the body, and at the same time to permit the door to swing from its closed position across the rear end opening to a position substantially parallel with one of the sides of the body or through an arc of three-quarters of a circle.

Other objects and uses relating to specific parts of the hinge and its mode of application will be brought out in the following description.

In the drawings—

Figure 1 is a perspective view of the upper rear corner of a vehicle body showing a portion of one side and the adjacent portion of the door hinged thereto.

Figs. 2 and 3 are horizontal sectional views taken, respectively, on lines 2—2 and 3—3, Fig. 1.

In order that my invention may be clearly understood, I have shown one of the rear corner upright posts —1— of a vehicle body as adapted to receive a side panel —2— and rear end door —2'—.

I have shown a portion of the frame of the door as provided with an upright side rail or stile —3— and an upper end rail —4— having their adjacent ends overlapped and halved into each other and suitably glued or otherwise secured to each other, thus producing a tight horizontal joint —5— along the lower edge of the horizontal rail across the rear face of the upright rail or stile —3—, and a tight vertical joint —6— along the inner upright edge of the rail —3— and across the outer face of the top rail —4—.

Ordinarily these rails would be additionally secured to each other at the joints by metal reinforcing plates to properly stiffen the frame and thereby relieve the joints from excessive strains, but in my present invention I have sought to utilize the hinges for the double purpose of bracing the door frame at the joints, and at the same time permitting the frame to swing from its closed position across the rear open end of the body to a position parallel with the side panels, and for this purpose have provided two hinge sections —7— and —8— pivotally connected by a pintle —9—.

The hinge section —7— is substantially L-shape in edge view and comprises a substantially flat rectangular main body —10— and a lateral offset portion —11— of considerably less width than the main body —10— and centrally disposed with relation to the ends thereof and terminating at its rear edge in suitable eyes —12— for receiving the pintle —9—.

The offset portion —11— is disposed at substantially right angles to the main body —10— and is of about the same width between said main body and eyes —12— as the thickness of the upright rail or stile.

The main body or plate —10— of the hinge section —7— is secured by screws —13— or equivalent fastening means to the rear face of the post —1— so that the offset portion —11— may lie in a plane just outside of that of the corresponding side of the post and panel —2— and close to the adjacent edge of the upright rail or stile —3—.

The main body of the hinge section —8— is substantially L-shape in face view and consists of an upright portion —14— and an offset portion —15— projecting laterally from one end of the upright portion —14— at right angles thereto, said upright portion being provided near its opposite end with an offset portion —16— projecting laterally from the side opposite the lateral extension —15— and terminating in an eye —17— registering with and between the eyes —12— for receiving the pintle —9—.

The upright portion —14— of the hinge section —8— extends some distance above and below the horizontal joint —5— between the upright rail —3— and horizontal rail —4— of the door frame and is secured to both rails by bolts or screws —18—, thereby bracing the adjacent ends of said rails against relative movement at the joint —5—.

The offset portion —15— extends from the main upright portion —14— across and some distance beyond the vertical joint —6— between the rails —3— and —4— so as to overlap upon the rear face of the rail —4— to which it is secured by a bolt or screw —18—, thereby bracing said rails —3— and —4— against relative movement at the joint —6— and firmly tying the two rails to each other.

A similar hinge is employed for securing the lower end of the door to the upright post —1—, except that the hinge section —8— is reversed so that the main upright portion —14— and offset portion —15— will connect the lower end of the upright rail —3— to the lower cross rail —4—, not shown, but serving the same function as that previously described for the upper hinge.

The main body of the hinge section —7— is preferably let into the rear face of the post —1— a distance corresponding to its thickness so as to allow the door when closed to abut against the rear face of the post for closing the opening as tightly as possible against the entrance of dust.

By positioning the hinge sections in the manner described, it is evident that the door may swing from its closed position at right angles to the sides to a position substantially parallel with said sides, as shown by dotted lines in Fig. 3, and while this is an important advantage in hinging the rear end doors to vehicle bodies, the principal advantage is that the hinge sections —8— serve the double purpose of permitting this swinging movement, and thereby bracing the upright and end rails of the door at their joints one with the other to afford the necessary stiffness to the frame without additional reinforcing or bracing means.

What I claim is:

1. In combination with the side and end door of a vehicle body, said door having an upright rail or stile and an end rail having overlapping ends mortised one upon the other, of a hinge composed of two metal sections, one of which is secured to the rear edge of the side and provided with a lateral offset extending across the adjacent edge of the door frame, the other section having a flat upright portion secured to the rear face of the upright rail and to the overlapping portion of the end rail, and having an offset portion extending beyond the inner edge of the upright rail and overlapping upon and secured to the rear face of the end rail of the door.

2. In a vehicle body, the combination of an upright rear end corner post and a rear end door extending across the rear face of the corner post and having an upright side rail and an end cross rail, said rails having their adjacent ends overlapping and mortised one upon the other, a hinge section comprising a flat plate secured to the rear face of the post and having its outer edge provided with an offset extending rearwardly across the adjacent upright edge of the door a distance corresponding approximately to the thickness of said door, another hinge section comprising a substantially flat main body extending a distance above and beneath the horizontal plane of the inner edge of the end rail and secured to the overlapping portions of both rails, said other hinge section having a lateral offset extending some distance beyond the inner edge of the side rail and upon the rear face of the end rail and secured to said end rail.

In witness whereof I have hereunto set my hand this 14th day of April, 1917.

FRANCIS G. DAVIS.

Witnesses:
C. M. HOWELL,
C. F. FUENCER.